United States Patent
Claessens et al.

(10) Patent No.: US 9,494,759 B2
(45) Date of Patent: Nov. 15, 2016

(54) OPTICAL FIBER ORGANIZER WITH TRAYS MOUNTED ON PIVOTING SUPPORT

(75) Inventors: Bart Mattie Claessens, Hasselt (BE); Bernardus Johannes Nicolas Geling, Genk (BE); Roel Modest Willy Bryon, Aarschot (BE); Kristof Vastmans, Boutersem (BE)

(73) Assignee: CommScope Connectivity Belgium BVBA (BE)

( * ) Notice: Subject to any disclaimer, the term of this patent is extended or adjusted under 35 U.S.C. 154(b) by 0 days.

(21) Appl. No.: 14/000,032

(22) PCT Filed: Feb. 13, 2012

(86) PCT No.: PCT/EP2012/052405
§ 371 (c)(1),
(2), (4) Date: Aug. 16, 2013

(87) PCT Pub. No.: WO2012/110452
PCT Pub. Date: Aug. 23, 2012

(65) Prior Publication Data
US 2013/0322839 A1    Dec. 5, 2013

(30) Foreign Application Priority Data
Feb. 17, 2011    (EP) .................................... 11154906

(51) Int. Cl.
*G02B 6/44*    (2006.01)
(52) U.S. Cl.
CPC ........... *G02B 6/4455* (2013.01); *G02B 6/4453* (2013.01)
(58) Field of Classification Search
CPC .................................................. G02B 6/4455
See application file for complete search history.

(56) References Cited

U.S. PATENT DOCUMENTS

| | | | | | |
|---|---|---|---|---|---|
| 4,266,853 | A | * | 5/1981 | Hutchins et al. | 385/135 |
| 4,832,436 | A | * | 5/1989 | Goto et al. | 385/53 |
| 4,911,521 | A | * | 3/1990 | Ryuto | G02B 6/4447 385/135 |
| 5,323,478 | A | * | 6/1994 | Milanowski | G02B 6/4452 385/135 |
| 5,323,480 | A | * | 6/1994 | Mullaney | G02B 6/4442 385/134 |
| 5,363,466 | A | * | 11/1994 | Milanowski | G02B 6/4452 385/134 |
| 5,740,298 | A | * | 4/1998 | Macken | G02B 6/4471 385/135 |
| 5,802,237 | A | * | 9/1998 | Pulido | 385/135 |
| 6,009,224 | A | * | 12/1999 | Allen | 385/135 |
| 6,192,180 | B1 | | 2/2001 | Kim et al. | |
| 6,253,016 | B1 | * | 6/2001 | Daoud | G02B 6/4442 385/134 |

(Continued)

FOREIGN PATENT DOCUMENTS

| GB | 2 316 496 | 2/1998 |
|---|---|---|
| WO | WO 97/32231 | 9/1997 |

(Continued)

OTHER PUBLICATIONS

International Search Report for International Application No. PCT/EP2012/052405 mailed May 15, 2012. (12 pages).

*Primary Examiner* — Rhonda Peace
(74) *Attorney, Agent, or Firm* — Merchant & Gould (57) ABSTRACT

The present invention relates to an optical fiber organizer (1) comprising at least one fiber storage means (4, 10, 19), a first support (3) for supporting the storage means, whereby the storage means (4, 10, 19) are rotatable connected to the first support (3), a second support (2) with at least one cable termination retention means for securing an incoming or outgoing cable having at least one optical fiber, characterized by the first support (3) being rotatably connected to the second support (2).

20 Claims, 9 Drawing Sheets

(56) References Cited

U.S. PATENT DOCUMENTS

| | | | | |
|---|---|---|---|---|
| 6,311,008 | B1 * | 10/2001 | Foss | G02B 6/4447 385/134 |
| 6,353,697 | B1 * | 3/2002 | Daoud | 385/136 |
| 6,418,266 | B1 * | 7/2002 | Vitantonio | 385/135 |
| 6,438,310 | B1 * | 8/2002 | Lance | G02B 6/4455 385/135 |
| 6,453,107 | B1 * | 9/2002 | Daoud | G02B 6/4445 385/135 |
| 6,625,374 | B2 * | 9/2003 | Holman | G02B 6/4453 385/134 |
| 6,701,056 | B2 * | 3/2004 | Burek et al. | 385/137 |
| 7,113,687 | B2 * | 9/2006 | Womack et al. | 385/135 |
| 7,340,145 | B2 * | 3/2008 | Allen | 385/135 |
| 7,418,184 | B1 | 8/2008 | Gonzales et al. | |
| 8,070,112 | B2 * | 12/2011 | Smrha et al. | 248/61 |
| 8,086,084 | B2 * | 12/2011 | Bran de Leon et al. | 385/135 |
| 8,540,436 | B2 * | 9/2013 | Claessens et al. | 385/89 |
| 8,934,750 | B2 * | 1/2015 | Benedetto et al. | 385/135 |
| 2007/0104447 | A1 | 5/2007 | Allen | |
| 2011/0116757 | A1 * | 5/2011 | Vanmeulen et al. | 385/135 |
| 2011/0222829 | A1 * | 9/2011 | Loeffelholz et al. | 385/135 |
| 2013/0315550 | A1 * | 11/2013 | James et al. | 385/135 |
| 2013/0322839 | A1 * | 12/2013 | Claessens | G02B 6/4455 385/135 |

FOREIGN PATENT DOCUMENTS

| | | |
|---|---|---|
| WO | WO 99/67670 | 12/1999 |
| WO | WO 2004/021061 | 3/2004 |
| WO | WO 2009/106874 | 9/2009 |

* cited by examiner

OPTICAL FIBER ORGANIZER WITH TRAYS MOUNTED ON PIVOTING SUPPORT

This application is a National Stage Application of PCT/EP2012/052405, filed 13 Feb. 2012, which claims benefit of Ser. No. 11/154,906.9, filed 17 Feb. 2011 in Europe and which applications are incorporated herein by reference. To the extent appropriate, a claim of priority is made to each of the above disclosed applications.

BACKGROUND

The present invention relates to the management of optical fiber connections and in particular concerns an optical fiber organizer and splice holder.

A known type of optical fiber organizer is described in PCT application WO 97/32231 A1 and in the PCT application WO 2009/106874 A1. The optical fiber organizer comprises an optical fiber storage means which is fixed to a support. The support comprises a cable termination retention means for securing incoming/outgoing cables having at least one optical fiber. The support is fixed to a casing of the optical fiber organizer. For each optical fiber storage means, one cable termination retention means is provided. The optical fiber storage means is rotatably connected to the support. The cable is guided in an area between the fiber storage means and the support.

SUMMARY

The object of the invention is to provide an improved optical fiber organizer. The object of the invention is achieved by the optical fiber organizer. The optical fiber organizer has the advantage that the proposed organizer provides a higher flexibility. This advantage is attained by a first support which is rotatably connected to a further element.

An embodiment of the optical fiber organizer has the advantage that the area between the first support of the fiber storage means and a second support can easily be accessed. This advantage is achieved by rotatably connecting the first support to a second support. For this reason, it is possible to rotate the first support away from the second support. Thus, it is possible to more easily access elements such as the cable, splitters, optical fiber etc. which may be arranged between the first and the second support.

In one embodiment, the storage means and the first support comprise clip means which clip the storage means in an open position relative to an adjacent storage means. For this reason, it is possible to fix the position of the storage means and, if it is advantageous, to loosen the clip means and to rotate the storage means in a further position.

In a further embodiment the first support comprises a first and a second section, which are rotatably connected. Therefore, it is possible to use the first support in different application, for example for a multi fiber circuit structure application or a single fiber circuit structure application. It is not necessary to produce different first supports. Furthermore, the application can be changed without having the need to use different first supports. Preferably, there is a second locking means which allows the locking of the first section in an inclined position referred to the second section. Furthermore, the first and/or second section may be fixed to a second support.

In a further embodiment, the first and the second support comprise second clip means which allow clipping the first support in a closed position relative to the second support. This means that, if it is not necessary to access the space between the first and the second support, the second clip means fix the first support closely to the second support. This provides a fiber organizer with a small constructed space. If it is necessary to access the space between the first and the second support, the second clip means can be loosened and the first support can be moved into an open position which means that through the larger space available between the first and the second support elements such as the cable, the fiber, optical components and/or splitters can easily be accessed.

In a further embodiment, several storage means are fixed to a first support and/or to a first and second section of the first support.

In a further embodiment, the optical fiber organizer comprises several first supports which are adjacently arranged and which are rotatably connected to the second support. As a result, it is possible to access all sections of the second support for accessing the elements.

In a further embodiment, the storage means is embodied as a plate with a guiding means for an optical fiber and/or a fixing means for a splice of optical fibers.

In a further embodiment, the optical fiber organizer comprises two first supports with a first and at least one second section, whereby the first supports are adjacently arranged and the respective first sections are rotatably connected to the respective second section in opposite directions.

Depending on the used embodiment, the fiber storing means are arranged in parallel to the second support or with a predetermined angle.

In a further embodiment, the first support is embodied as a groove plate, e.g. as a T-groove plate. The T-groove plate allows bending and straight routing of the fiber.

BRIEF DESCRIPTION OF THE DRAWINGS

Various embodiments of the present invention will now be described in more detail by way of example only, with reference to the accompanying drawings in which.

DETAILED DESCRIPTION

Figure 1:
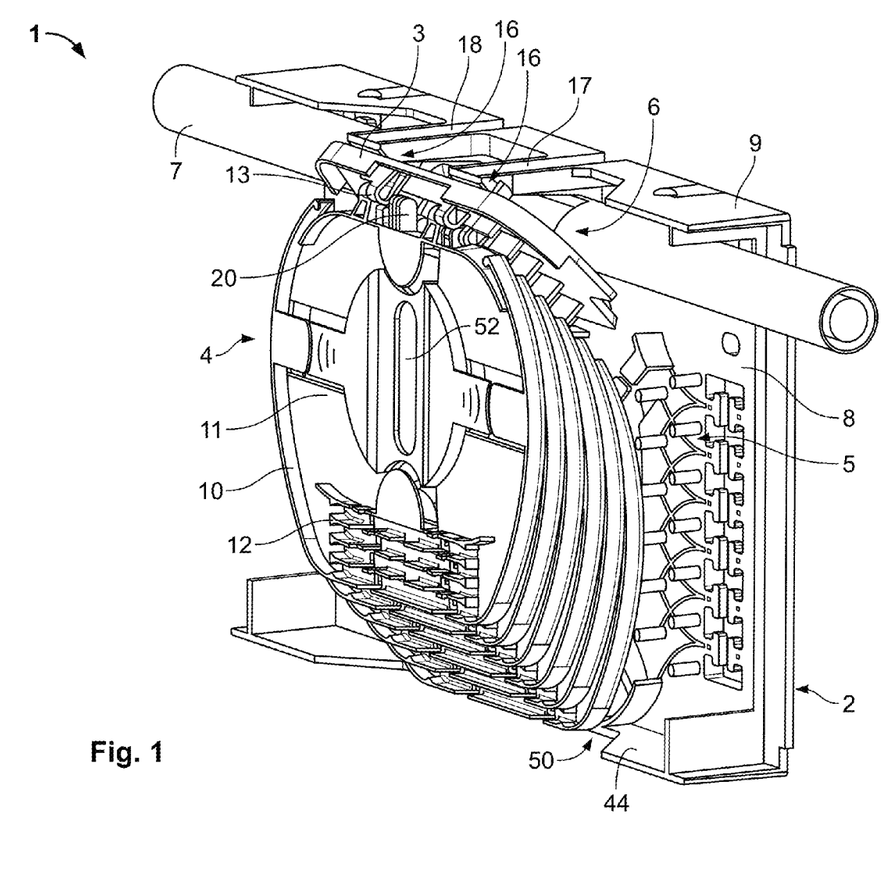
FIG. 1 is a perspective view of a part of an optical fiber organizer with fiber storage means, a first support and a second support and a fiber cable.

FIG. 1 shows the main parts of the optical fiber organizer 1 with a second support 2 with a first support 3 and several storage means 4. The second support 2 is embodied as a base plate 8, e.g. as a grooved plate which comprises first means 5 for receiving, storing and guiding optical cables and optical fibers. The second support 2 may be part of a housing for the organizer. The first means 5 may be embodied as walls, openings or pins. The second support 2 furthermore provides a receiving area 6 for receiving a cable 7 which may comprise several optical fibers. The cable 7 may end in the receiving area 6 or may be guided through the receiving area 6. The receiving area 6 is disposed in an edge region defined by the base plate 8 of the second support 2 and a sidewall 9 of the second support 2. The cable 7 may be fixed to the second support 2 by cable-fixing elements (not shown).

Above the base plate 8, several storage means 4 which are embodied as organizer trays 10 are disposed. The organizer trays 10 have a basic shape of a plate and are arranged in parallel to each other and in parallel to the base plate 8. The organizer trays 10 may be constructed identically. Each organizer tray 10 may comprise fiber guiding means 11 and splice fixing means 12. Each of the organizer trays 10 is rotatably connected to the first support 3 by hinge means 13. The hinge means 13 allows for a rotation of the organizer tray 10 around a predetermined rotational axis. In this embodiment, the rotational axis is arranged in parallel to the direction of the cable 7 in the receiving area 6 and to a plane of the first support 3.

The first support 3 may be embodied in the shape of a plate which is also rotatably fixed to the second support 2 by means of a second hinge means 15. The second hinge means 15 is arranged at a first rim of the first support 3 which is dedicated to the base plate 8. At an opposite rim, second clip means 16 are disposed which fix the first support 3 in the shown closed position. The second clip means 16 comprise a nose and a recess which are arranged on the first support 3 and on the sidewall 9. In the shown embodiment, the sidewall 9 has two bars 17, 18. At free ends of the first and second bar 17, 18, a part of the second clip means 16 are disposed.

The trays 10 constitute individual optical fiber storage means for storing lengths of fiber, commonly referred to as "pig tails" for connecting to other optical fibers or components located on or in the individual trays. The trays comprise fiber guide elements and holders 12 which are designed to hold optical fiber splices. The first support 3 comprises a molded structure having a plurality of pairs of mounting means in the form of integrally molded protrusions containing apertures for receiving hinge pins formed on the respective optical fiber storage trays 10. The protrusions and the respective hinge pins define a hinge axis around which the respective trays 10 rotate relative to the first support 3.

The second support 2 has a second sidewall 44 which is arranged in parallel to the first sidewall 9. The second sidewall 44 has a recess 50 in an area adjacent to rims of the trays 10.

Each of the trays comprises a slit 52 which is arranged in the middle of the tray 10 and in parallel to a moving direction of the trays from an open to a closed position. Therefore, it is possible to fix the trays 10 with one bolt which is screwed in a thread 53 on the bottom of the base plate 8 (FIG. 3).

Figure 2:
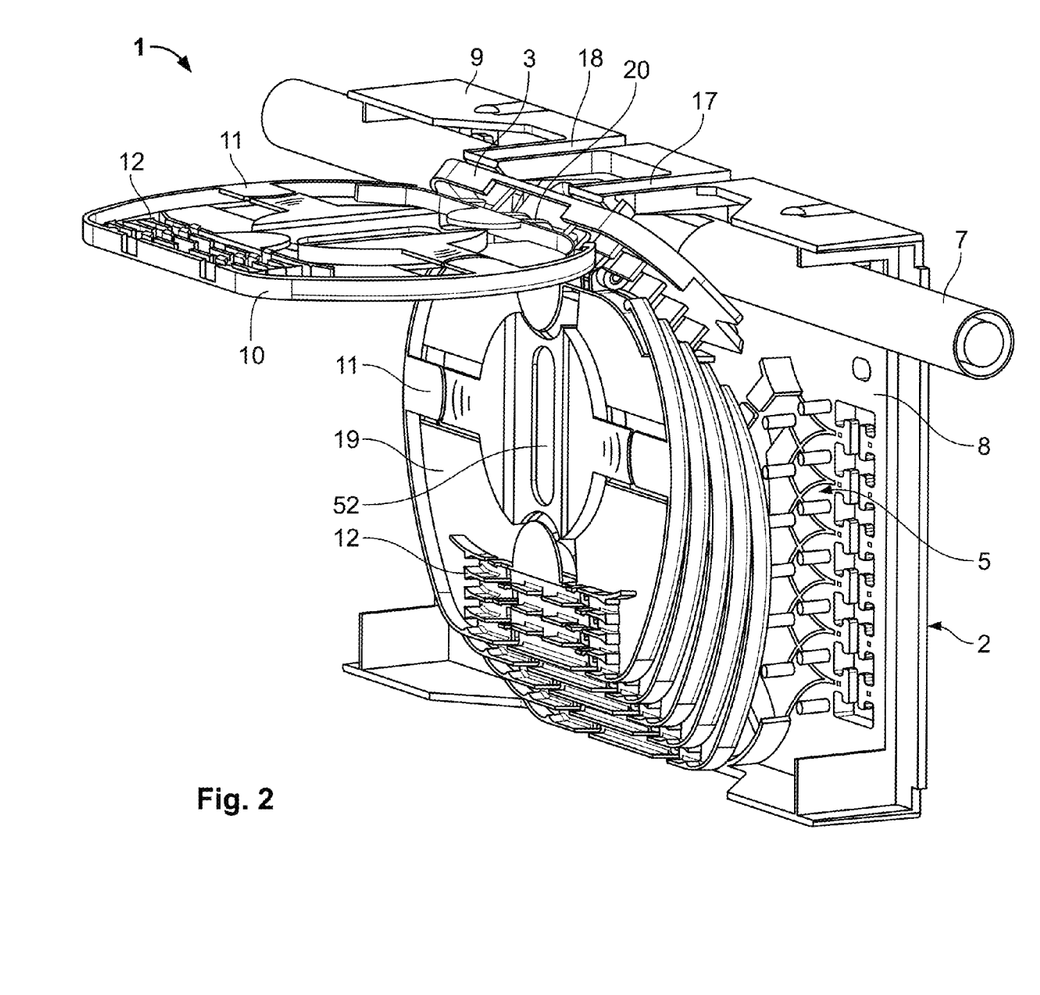
FIG. 2 shows the optical fiber organizer of FIG. 1 whereby a storage means is in an open position.

FIG. 2 shows the upper organizer tray 10 which is rotated from the close position of FIG. 1 into an open position. In the open position, a second organizer tray 19 is accessible. This is necessary for mounting the fiber and/or the splices in the second organizer tray 19. There are first clip means 20 disposed on the first support 3 and the trays 10, 19 for fixing the tray 10 in the closed and/or open position.

The first clip means 20 are constructed for example as a nose and a recess which are configured to fix the trays 10, 19 in the closed position (FIG. 1) relative to the first support 3 and in the open position (FIG. 2) relative to the first support 3.

Figure 3:
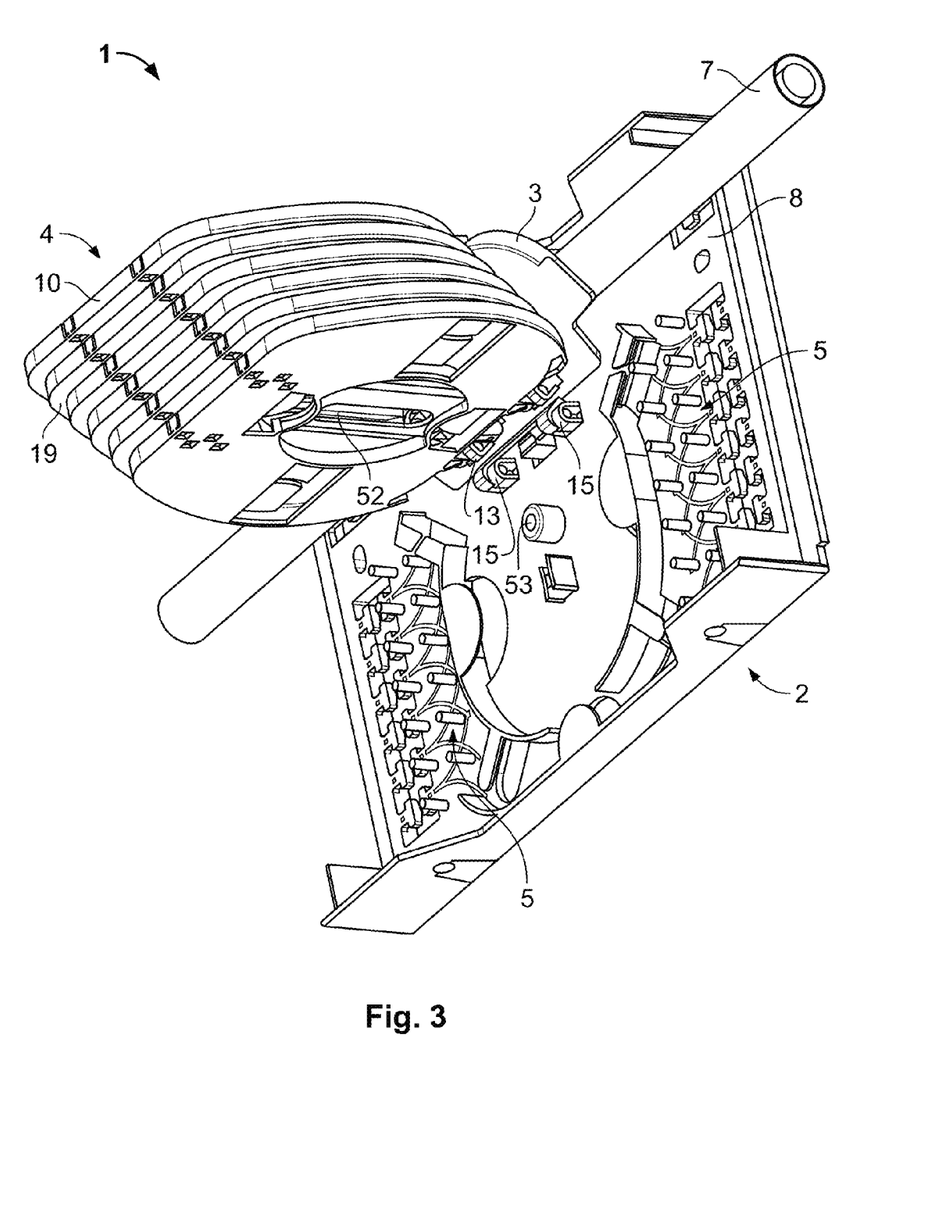
FIG. 3 shows the optical fiber organizer of FIG. 1 whereby all fiber storage means are arranged in the open position.

FIG. 3 shows the situation in which all the trays 10, 19 are rotated in the open position. In this situation, the second hinge means 15 can be seen, which rotatably connect the first support 3 to the second support 2.

Figure 4:
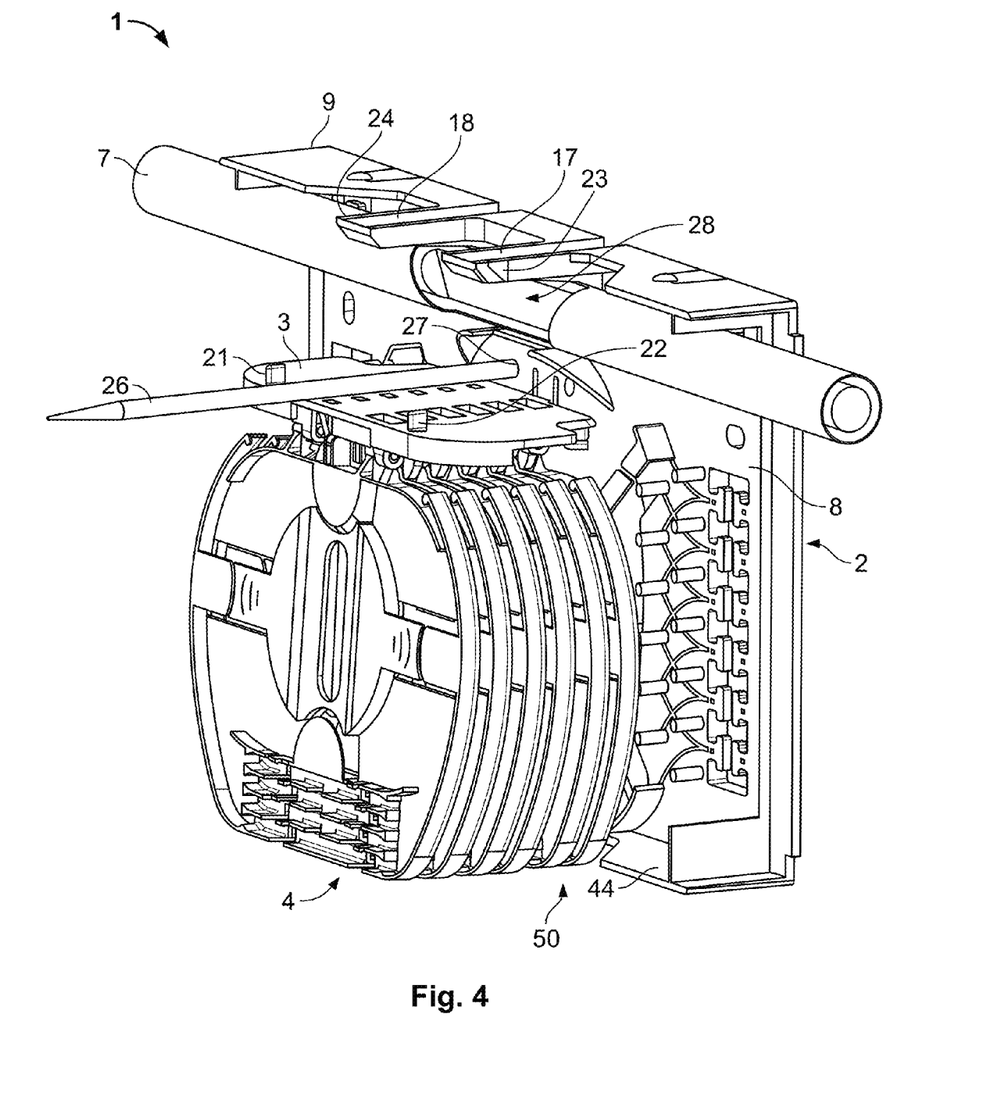
FIG. 4 shows the optical fiber organizer with a first support being in an open position.

FIG. 4 shows the situation that the first clip means 20 are loosened and the first support 3 is rotated in an open position. In the open position, the first support 3 is arranged vertically to the base plate 8. The first support 3 comprises two snap arms 21, 22 at a side which is dedicated to the sidewall 9. The snap arms 21, 22 engage with recesses 23, 24 of the first and second bars 17, 18 to fix the first support 3 in the closed position. The snap arms 21, 22 and the recesses 23, 24 constitute the second clip means 16.

Furthermore, a locking means 26 is arranged which locks the first support 3 in the open position. The locking means 26 is embodied as a pin which is stuck into the second opening 27 of the base plate 8. If the first support 3 is in the open position as shown in FIG. 4, the area 28 between the first support 3 and the second support 2 can easily be accessed. In the area 28, the optical fiber cable 7 is broken out to separate the individual mini-tubes, each of which may contain a dozen or so optical fibers that are to be arranged and spliced within the optical fiber organizer. Thus, it is possible to easily access a cable 7, optical components, splitters or other elements which may be disposed in the area 28. In the open position of the first support 3, rims of the trays 10, 11 protrude in the recess 50 of the second sidewall 44.

Due to this new construction, it is possible to provide an optical fiber organizer with a small constructed size which allows large free access to the cable 7 and other components which are arranged in the area 28 between the first and the second support 2, 3.

As becomes obvious when comparing the situation of FIG. 1 and FIG. 4, the height of the staple of the trays 10, 19 of the optical fiber organizer 1 in FIG. 4 is higher than in the position of FIG. 1. Furthermore, free space is available for accessing the cable 7 in the area 28 between the first support 3 and the second support 2 in the position of the first support of FIG. 4.

In FIGS. 1 to 4, a cover is not shown which is fixed to the base plate in order to enclose the optical fiber organizer.

Figure 5:
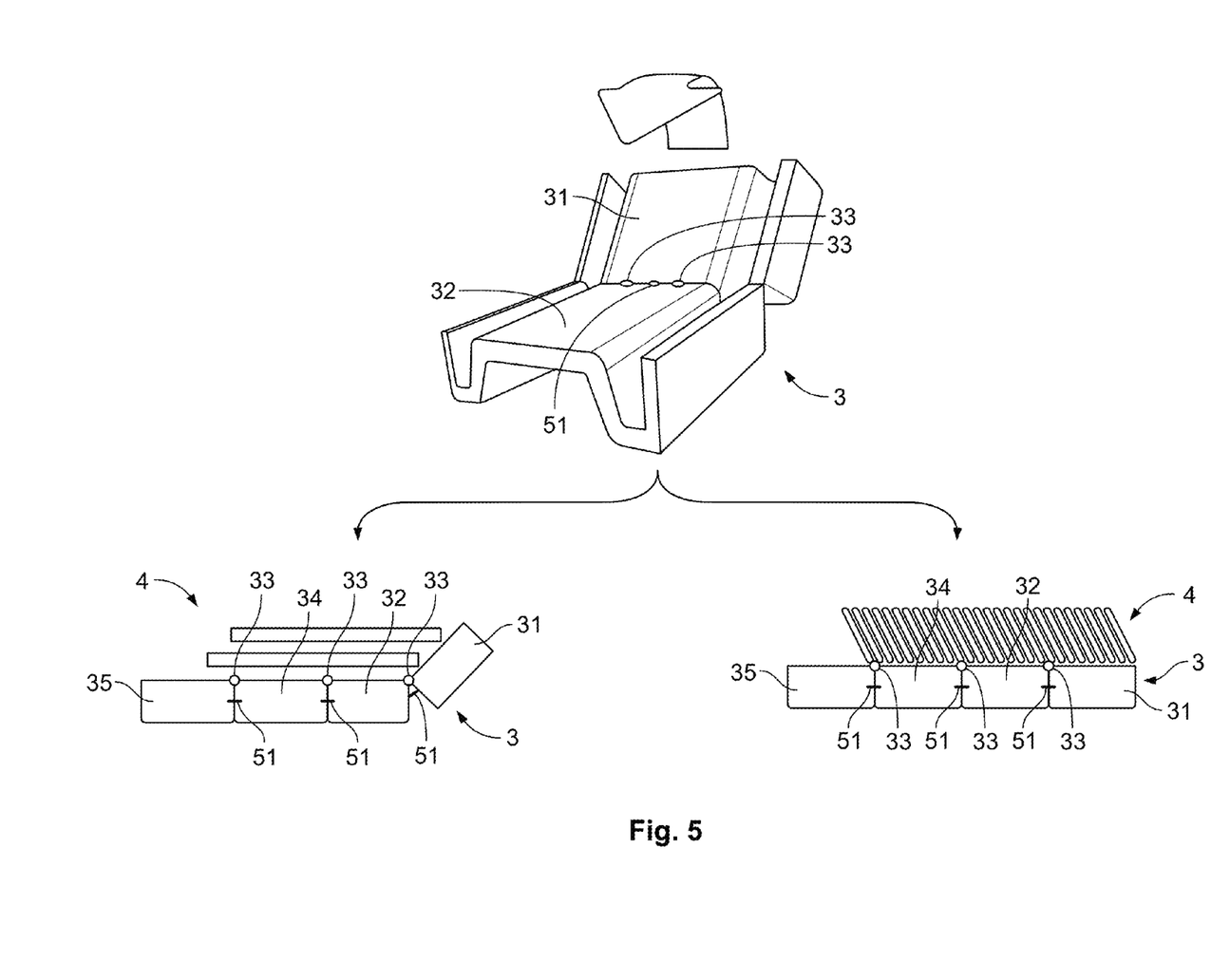
FIG. 5 shows a schematic drawing of a first support with two sections.

FIG. 5 shows a basic embodiment of the optical fiber organizer with a first support 3 comprising a first and a second section 31, 32. The first and the second section are connected by third hinge means 33, which allows a rotation of the first section 31 relative to the second section 32 as shown in FIG. 5 and as depicted by the arrow. Furthermore, there are second locking means 51 disposed which lock the two sections 31, 32 in a straight and/or in an inclined position as shown. The locking means 51 may be embodied as a pair of a latch and a recess. This basic idea of using a first support 3 with several sections can be applied to different types of optical fiber organizers, e.g. the type of a single fiber circuit structure application, and to the type of a multi fibre circuit structure application, as shown in FIG. 5. The main difference between the single fiber circuit structure organizer and the multi fibre circuit structure organizer is that in the single fiber circuit structure organizer, the storage means are arranged at a predetermined angle relative to the plane of the first support 3. The multi fiber circuit structure organizer uses storage means 4 which are basically arranged in parallel to the plane of the first support 3. For the multi fiber circuit structure application the first section 31 is locked in the inclined position. For the single fiber circuit structure application the first section 31 is locked in the straight position. The first and second section may be embodied identical, especially have fixing means for fixing storage means 4, especially storage trays. In the shown embodiment, the first support comprises a third and a fourth section 34, 35. Each section may be rotatably connected by third hinge means may be arranged between adjacent sections. The embodiment of the optical fiber organizer shown in FIGS. 1 to 4 relates to a single fiber circuit structure application.

Figure 6:
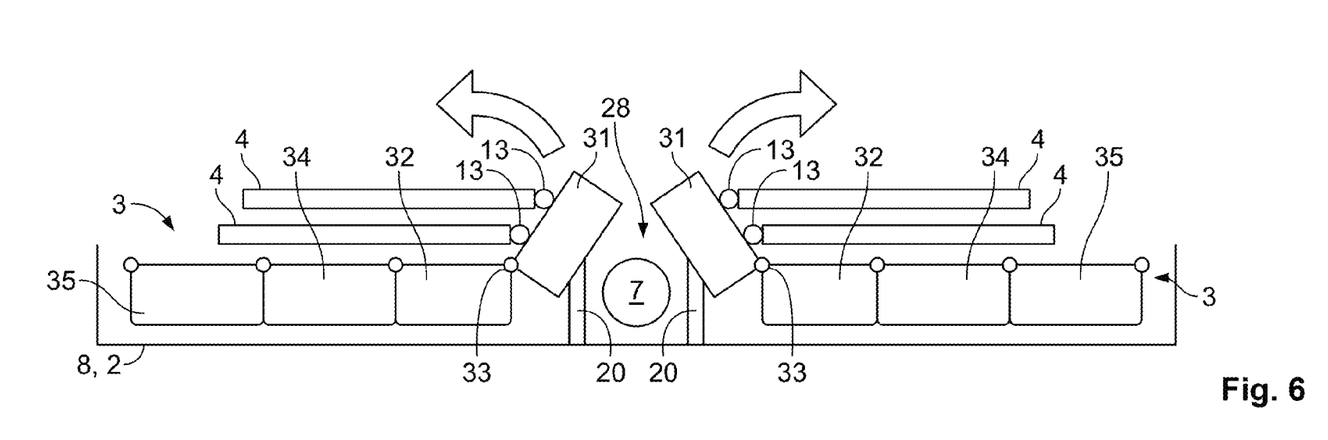
FIG. 6 shows a further embodiment of an optical fiber organizer with two first supports with fiber storage means which are arranged in parallel to the second support.

FIG. 6 shows a schematic drawing of a multi fiber circuit structure application, whereby on a second support 2 two first supports 3 are disposed. Between the two first supports 3, the cable 7 and/or further elements are arranged. Each first support 3 comprises several sections 31, 32, 34, 35 which are connected to the second support 2. The first section 31 of the first support 3 is detachably connected to the second support 2 by first clip means 20. The two first sections 31 of the two adjacently arranged first supports 3 are disposed at a predetermined angle of about 45° with regard to the plane of the second support 2. The two first sections 31 of the first supports 3, which are arranged in an inclined manner, cover the area 28 in which the cable 7 and/or other optical components is disposed. Instead of the first chip means 20, there might be a second locking means 51 which locks the first section in the inclined position as explained referring to FIG. 5 with third hinge means 33 and second locking means 51 between two adjacent sections of a first support 3. In a further embodiment, two first supports 3 may be designed as explained referring to FIG. 5.

The storage means 4 are rotatably connected to the first section 31 by a hinge means 13, as explained in FIGS. 1 to 4.

Figure 7:
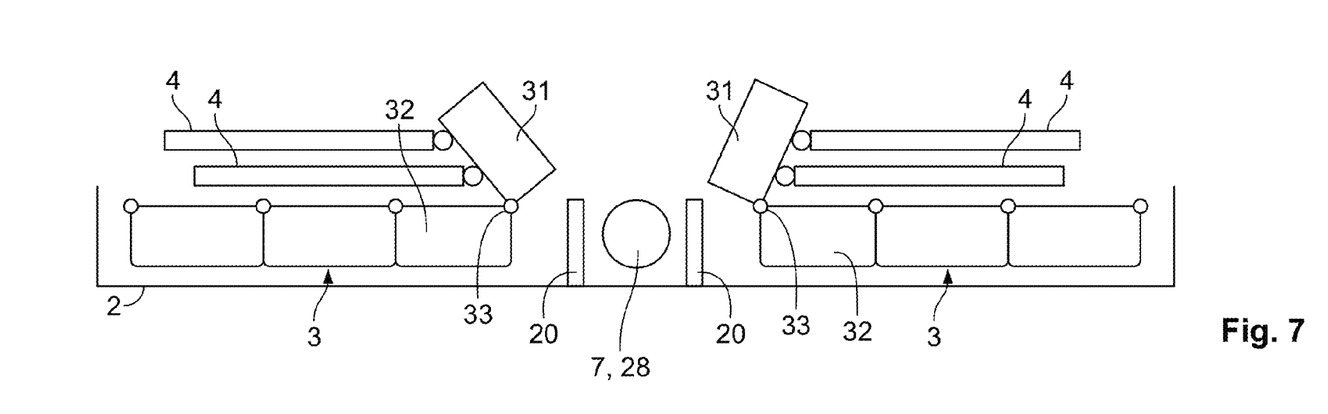
FIG. 7 is a schematic drawing of the optical fiber organizer of FIG. 6 with the first supports being in an open position.

If a free space for accessing the area 28 or the cable 7 is required, the first clip means 20 of the first sections 31 of the two first supports 3 are removed and the first sections 31 are rotated away from the area 28, as shown in FIG. 7. In this position, it is possible to have an enlarged free space in order to access the area 28 or the cable 7. Furthermore, in the area 28, several elements, e.g. optical components, splitters etc. may be disposed. If there are second locking means between the first and the second section 31, 32, the first chip means 20 is not required.

The first section 31 of each first support 3 is rotatably connected to the second section 32 of the respective first support 3 by third hinge means 33.

Figure 8:
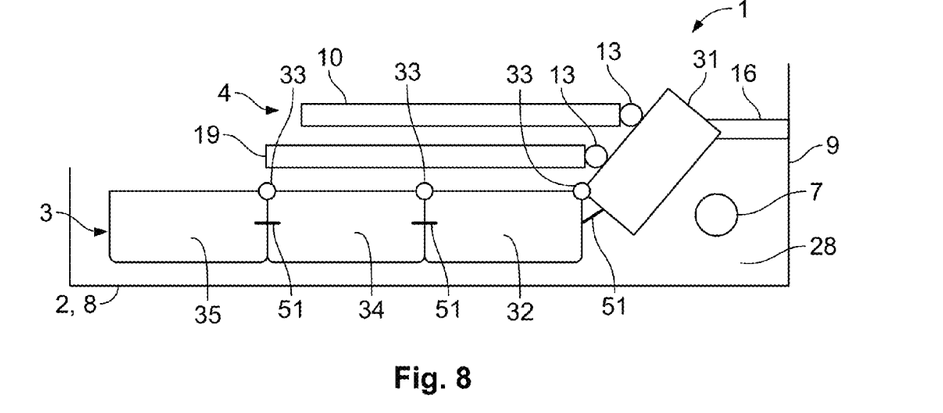
FIG. 8 is a further embodiment of an optical fiber organizer.

FIG. 8 shows a further embodiment of a multi optical fiber circuit structure organizer 1 with a first support 3 with a first, second, third and fourth section 31, 32, 34, 35. The second, third and/or the fourth section 32, 34, 35 are fixed to the second support 2. The first section 31 is arranged with a predetermined angle relative to the other sections 32, 34, 35 being disposed above the other sections 32, 34, 35. The first section 31 covers the area 28 in which the cable 7 or further elements, e.g. splitters, optical components etc., are arranged. The first section 31 is rotatably connected to the second support 2 by second clip means 16. The storage means 4 which are disposed as trays 10, 19 are rotatably connected to the first section 31 by hinge means 13. The first section 31 is rotatably connected to the second section 32 by third hinge means 33. The first section 31 of the first support 3 may be connected to a sidewall 9 of the second support 2 by the second clip means 16. If the area 28 is to be accessed, the second clip means 16 are loosened and the first section 31 can be rotated via the rotational axis of third hinge means 33 away from the sidewall 9 as depicted by the arrow shown in FIG. 8. Thus, it is possible to access the area 28. The first support 3 may be embodied in the same design as the first support 3 of FIG. 5, whereby each section is rotatably connected to one adjacent section and second locking means are arranged between two adjacent sections.

Figure 9:
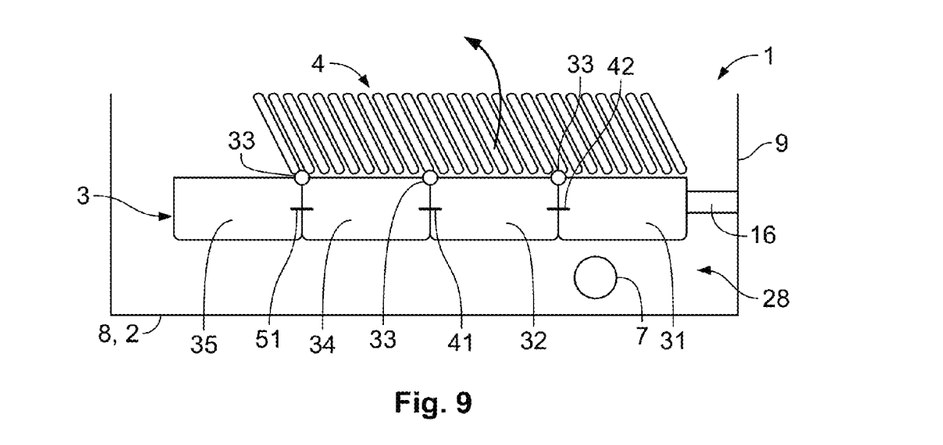
FIG. 9 is a further embodiment of an optical fiber organizer.

FIG. 9 shows a further embodiment of a single fiber circuit structure organizer 1 with a second support 2 and a first support 3. The first support 3 is made of a first, a second, a third and a fourth section 31, 32, 34, 35. At least the fourth section 35 is detachable fixed to the base plate 8. The first section 31 is connected to the second support 2 by a second clip means 16, e.g. to the sidewall 9. In the shown embodiment, each section 31, 32, 34, 35 is rotatably connected to the adjacent section by a third hinge means 33. However, in this embodiment storage means 4 are also rotatably connected to the first, the second and the third section 31, 32 and 34. The storage means 4 are embodied as trays 10, 19 which are connected by hinge means (not shown), as shown in detail in FIGS. 1 to 4. For this reason, second locking means 51 are arranged between the first and the second section 31, 32 and between the second and the third section 32, 34. The locking means 51 hold the first, second and third section 31, 32, 34 in one plane in a stable manner. If the area between the base plate 8 of the second support 2 and the first support 3 in which e.g. the cable 7 or further elements are disposed is to be accessed, the second clip means 16 is removed and the first, the second and the third section 31, 32, 34 are rotated around the rotational axis of the third hinge means 33 which is disposed between the third and the fourth section 34, 35. Depending on the used embodiment, the second clip means 16 is not provided. The first support 3 is designed as explained referring to FIG. 5.

Figure 10:
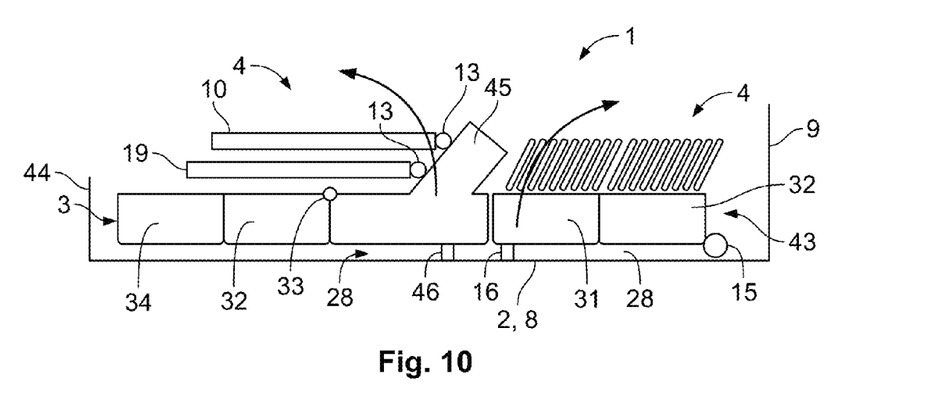
FIG. 10 is a further embodiment with an optical fiber organizer.

FIG. 10 shows a combination of a single and a multi optical fiber circuit structure organizers 1 with a first support 3 and a further first support 43. The further first support 43 comprises a first and a second section 31, 32, the first and the second section 31, 32 being fixed to one another and to the second support 2. The second section 32 is rotatably connected to the second support 2 by second hinge means 15. Furthermore, the first and/or the second section 31, 32 are connected to the second support 2 by detachable second clip means 16. If the area 26 between the first and the second support 3, 2 is to be accessed, the second clip means 16 is released and the first support 3 is rotated in the direction of the adjacent sidewall 9 of the second support 2, as depicted by the arrow. Adjacent and in one plane to the first support 3, a further first support 43 is disposed. The further first support 43 comprises a T-groove plate 45. Two storage means 4 embodied e.g. as trays 10, 19 are rotatably connected to the T-groove plate 45 by hinge means. The storage means 4 are arranged in parallel to the plane of the further sections 32, 31 of the further first support 43. The T-groove plate 45 is fixed to the second support 2 by a further clip means 46. Furthermore, the T-grooved plate 45 is rotatably connected to a second section 32 of the first support 3 by a third hinge means 33. If the area 28 between the T-grooved plate 45 and the base plate 8 of the second support 2 is to be accessed, the further clip means 46 is removed and the T-groove plate 45 is rotated around the rotational axis of the third hinge means 33 in the direction of a second sidewall 4, as depicted by the arrow.

Figure 11:
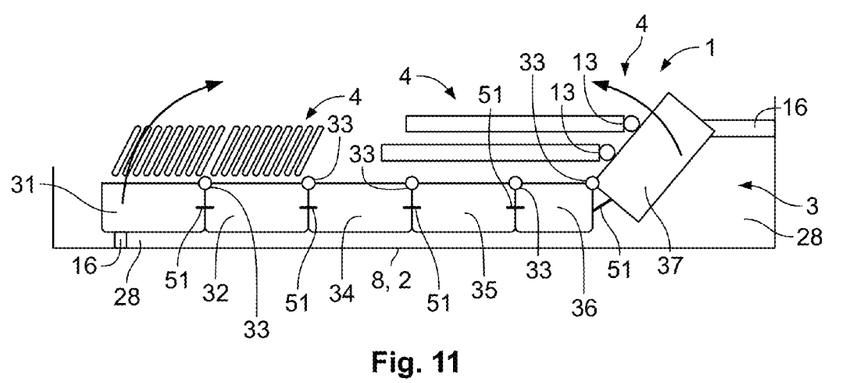
FIG. 11 shows a further embodiment of an optical fiber organizer.

FIG. 11 shows a further embodiment of an optical fiber organizer 1 with a first support 3 with a first, second, third, fourth, fifth and sixth section 31, 32, 34, 35, 36, 37. The first and the second section 31, 32 are fixed to each other by second locking means 51 and several storage means 4 are fixed to the first and second section 31, 32 by hinge means (not shown). The third section 34 is fixed to the second support 2. The third, the fourth and the fifth section 34, 35, 36 are fixed to one another. The sixth section 37 is rotatably connected to the fifth section 36 by a third hinge means 33. Furthermore, there are second locking means 51 arranged between the fifth and sixth section 36, 37. The sixths section 37 is fixed in the inclined position as shown. Moreover, the second section 32 is rotatably connected to the third section 34 by a third hinge means 33. The sixth section 37 is bent away from the base plate 8 of the second support 2. Storage means 4 are rotatably connected to the sixth section 37 by hinge means 13. The storage means 4 of the sixth section 37 are arranged as plate-shaped trays which are disposed in parallel to the base plate 8. Depending on the embodiment, the first section 31 and the fifth section 36 may be connected to the second support 2 by means of second clip means 16. Between the first section 31 and the base plate 8 or between the sixth section 37 and the base plate 8, the cable or other optical components such as splitters may be disposed. If the area 28 between the first section 31 and the base plate 8 or the area 28 between the sixth section 37 and the base plate 8 are to be accessed, the respective second clip means 16 and/or the second locking means 51 is loosened. The first and the second section 31, 32 can then be rotated in the direction of the sixth section 37 around the axis disposed by the third hinge means 33. Furthermore, if a person would like to access the area 28 beneath the sixth section 37, the respective second clip means 16 and/or the second locking means 51 is loosened and the sixth section 37 is rotated around the rotational axis which is disposed by the third hinge means 33, as depicted by an arrow in FIG. 11.

Figure 12:
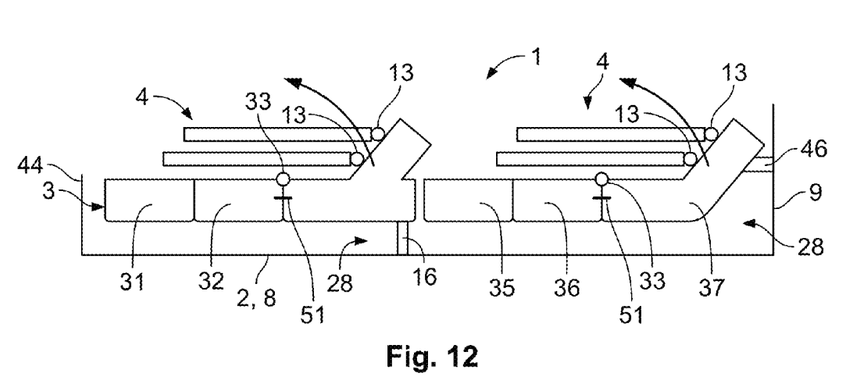
FIG. 12 is a further embodiment of an optical fiber organizer.

FIG. 12 shows a further embodiment of an optical fiber organizer 1 with a first support 3 comprising a first, second, third, fourth, fifth and a sixth section 31, 32, 34, 35, 36, 37. The first and the second section 31, 32 are connected to the second support 2. The third section 34 is rotatably connected by a third hinge means 33 to the second section 32. The third section 34 is e.g. embodied as a T-groove plate. A part of the third section 34 is inclined in a direction away from the base plate 8. At the inclined section, storage means 4 are rotatably connected to the third section 34 by hinge means 13. The third section 34 is connected to the base plate 8 by second clip means 16. The fourth and fifth section 35, 36 are connected to the base plate 8 of the second support 2. The sixth section 37 is rotatably connected to the fifth section 36 by a hinge means 33. An end part of the sixth section 37 is inclined in a direction away from the base plate 8. At the inclined section, two storage means 4 are rotatably connected to the sixth section 37 by hinge means 13. The sixth section 37 is connected to a sidewall 9 of the second support 2 by further clip means 46. If the area 28 between the third section 34 or the sixth section 37 is to be accessed, the second clip means 16 or the further clip means 46 have to be released. The third section 34 can then be rotated around the rotational axis of the third hinge means 33 in direction of a second sidewall 44 of the second support 2, as it is depicted by an arrow. Furthermore, the sixth section 37 can be rotated around the axis of the third hinge means 33 in the direction of the second sidewall 4, as it is depicted by the arrow. In the area 28, the cable 7 or other components, e.g. optical components of splitters may be disposed. Depending on the used embodiment each section may be connected with an adjacent section rotatably by a third hinge means and by a second locking means 51 as explained referring to FIG. 5.

Figure 13:
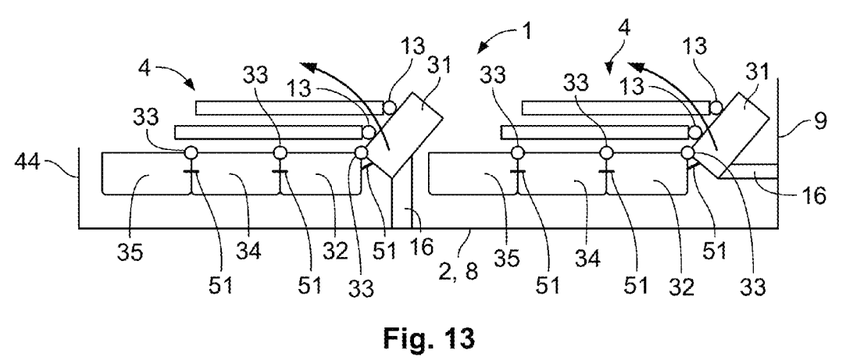
FIG. 13 shows a further embodiment of an optical fiber organizer.

FIG. 13 shows an embodiment with two first sections 3 as explained in FIG. 5. The first sections 31 are detachably fixed by a second clip means 16 to the second support 2. At least one of the fourth, third or second section 35, 34, 32 is detachable fixed to the second support 2. The second support 2 may be part of a housing. Depending on the use embodiment, one of the first support 3 may be proposed as shown in FIG. 9 in a straight position with trays arranged in an inclined manner relative to the plane of the second support 2.

Figure 14:
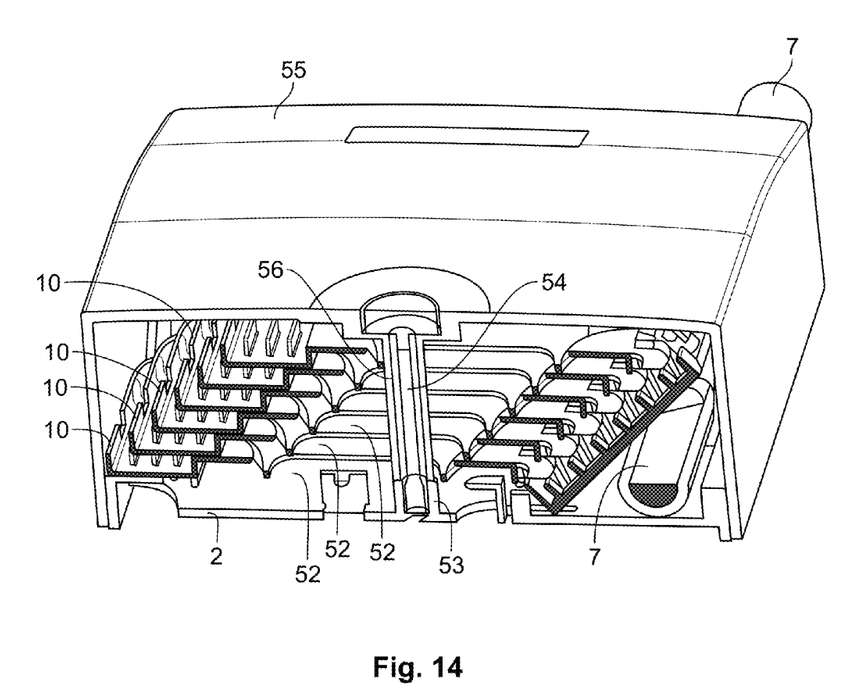
FIG. 14 shows a cross sectional view of a housing of the optical fiber organizer.

FIG. 14 shows a cross-sectional view of a housing for the embodiment of the FIGS. 1 to 4 The second support 2 is covered by a cover 55. A bolt 54 is guided from the cover 55 via the slits 52 of the trays 10 to the thread 53 fixing the cover 55 to the second support 2.

Depending on the used embodiment, there is a guidance 56 from the cover 55 to the thread 53, whereby the bolt 54 is arranged in the guidance 56.

The invention claimed is:

1. An optical fiber organizer comprising:
at least one fiber storage means, a first support for supporting the storage means, whereby the storage means are rotatably connected to the first support between an access position and a storage position, wherein the first support being rotatably connected to a further element between an open position and a closed position, wherein the further element is a second support, wherein the fiber storage means are parallel to each other and parallel to the further element when the first support is in the closed position and the fiber storage means are in the storage position, wherein a locking means is provided which fixes the first support in an open position relative to the second support.

2. A fiber organizer according to claim 1, wherein the first support comprises several sections, whereby a first section is connected to a second section as a further element.

3. A fiber organizer according to claim 2, wherein the first section and the second section of the first support comprise second locking means which lock the first section in an inclined position referred to the second section.

4. A fiber organizer according to claim 3, wherein the second section comprises fixing means for fixing storage means.

5. A fiber organizer according to claim 2, wherein the second section of the first support is fixed to the second support.

6. A fiber organizer according to claim 5, wherein two first supports with storage means with at least two sections are arranged, whereby at least one section of each first support is rotatably connected to a second section of the respective first support in the same or in different directions.

7. A fiber organizer according to claim 6, wherein the first support comprises storage means which are arranged in parallel to the second support and the further first support comprises storage means which are arranged in an inclined manner relative to the plane of the second support.

8. A fiber organizer according to claim 1, wherein the storage means and the first support comprise clip means which clip the storage means in an open position relative to an adjacent storage means.

9. A fiber organizer according to claim 1, wherein the first and second support comprise second clip means which clip the first support relative to the second support.

10. A fiber organizer according to claim 9, wherein the first support can be moved in an open position by loosening the second clip means, whereby in an open position an access is provided to an area between the first and second support, whereby elements an optical fiber, a splitter, an optical component, and a cable can be accessed more easily in the area.

11. A fiber organizer according to claim 1, wherein the storage means is a tray for an optical fiber and/or an optical splice.

12. A fiber organizer according to claim 11, wherein several trays are rotatable connected with the first support.

13. A fiber organizer according to claim 12, wherein the trays are provided with slits through which a bolt is guided.

14. An optical fiber organizer comprising:
a base plate;
a support rotatably fixed about a first hinge axis to the base plate between an open position and a closed position; and
a plurality of fiber storage trays rotatably connected to the support, each fiber storage tray rotatably connected about a second hinge axis between an access position and a storage position, the support rotating with respect to the base plate and the plurality of fiber storage trays rotating with respect to the support to provide access to the base plate, wherein the fiber storage trays are independently rotatable with respect to the support, wherein the fiber storage trays are parallel to each other and parallel to the base plate when the support is in the closed position and the fiber storage trays are in the storage position, wherein when the support is in the open position access is provided to an area between the base plate and the support.

15. The optical fiber organizer of claim 14, further comprising a clip to hold the support in the closed position.

16. The optical fiber organizer of claim 14, wherein the fiber storage trays comprise an aperture providing access to the base plate.

17. The optical fiber organizer of claim 14, wherein the fiber storage trays comprise optical fiber guides to direct the optical fibers.

18. The optical fiber organizer of claim 14, further comprising a clip to hold the fiber storage trays in an open position.

19. The optical fiber organizer of claim 14, wherein the base plate comprises an optical fiber receiver accessible from the plurality of fiber storage trays.

20. The optical fiber organizer of claim 14, wherein the element includes a cable extending in the area parallel to the first hinge axis.

\* \* \* \* \*